(No Model.)
E. F. AUTENRIETH.
SWING SAW MACHINE.
No. 460,699. Patented Oct. 6, 1891.
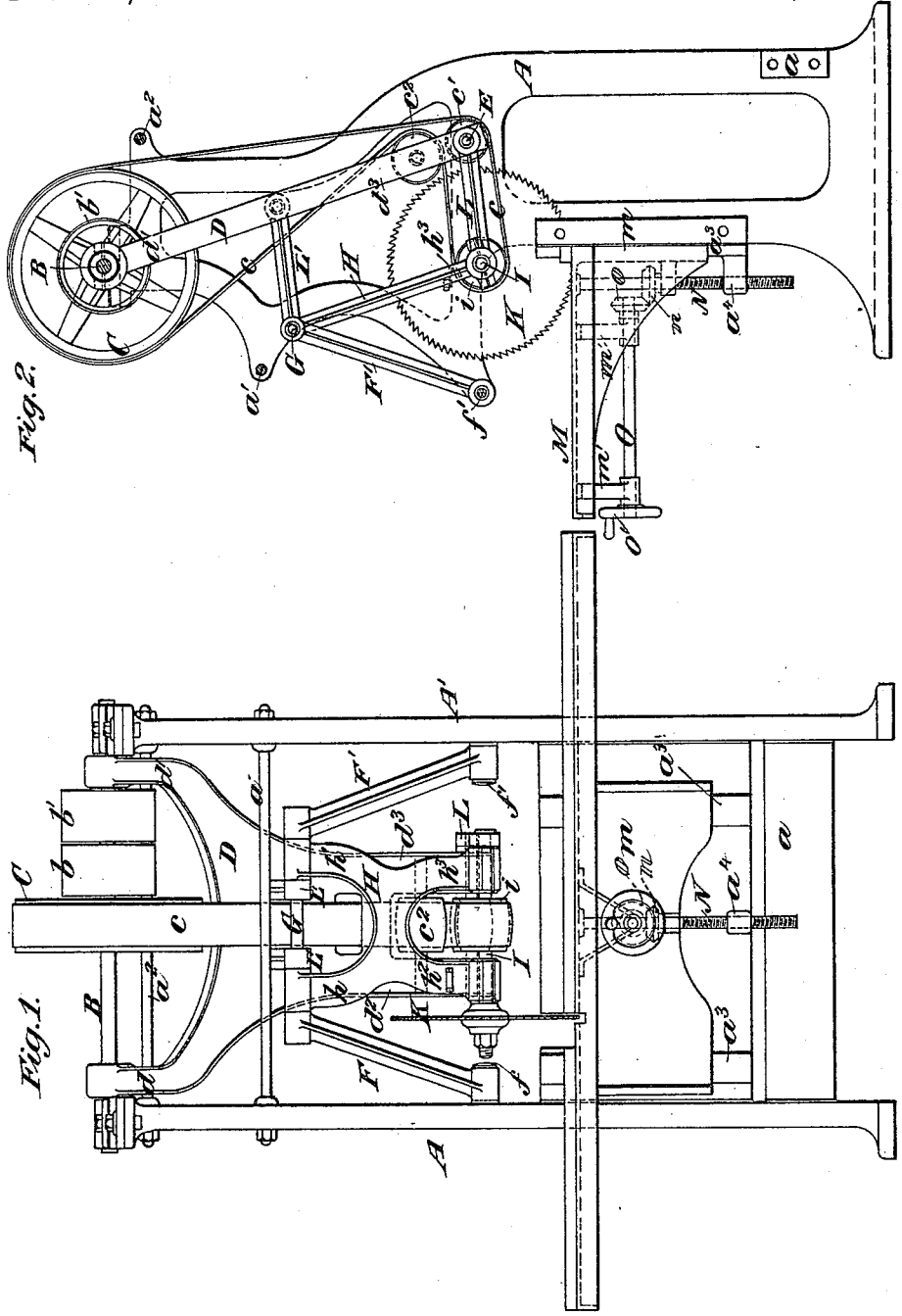
WITNESSES:
George Barry.
D. H. Haywood.
INVENTOR
Ernst F. Autenrieth
BY Brown Seward
ATTORNEYS

UNITED STATES PATENT OFFICE.

ERNST F. AUTENRIETH, OF NEW YORK, N. Y.

SWING-SAW MACHINE.

SPECIFICATION forming part of Letters Patent No. 460,699, dated October 6, 1891.

Application filed April 7, 1891. Serial No. 387,978. (No model.)

*To all whom it may concern:*

Be it known that I, ERNST F. AUTENRIETH, of the city and county of New York, in the State of New York, have invented a new and useful Improvement in Swing-Saw Machines, of which the following is a specification.

My invention relates to an improvement in swing-saw machines, in which a saw or other suitable cutter is mounted in a swinging frame and caused to travel in a right line as the frame is swung upon its support.

A practical embodiment of my invention is represented in the accompanying drawings, in which—

Figure 1 is a view of the machine in front elevation; and Fig. 2 is a view in side elevation, partly in section, one side of the supporting-frame being removed to show more clearly the operating mechanism.

The supporting-frame which I have chosen for the purpose of my present invention comprises a pair of skeleton uprights A A', connected by suitable girders $a$, $a'$, and $a^2$. A drive-shaft B is journaled in suitable bearings at the upper portion of the supporting-frame and is provided with pulleys $b$ and $b'$, one fixed thereon and the other loose thereon, as is common, for the reception of a driving-belt leading to a source of power. (Not shown.) The shaft B is further provided with a drive-wheel C, fixed thereon, by means of which a rotary movement is imparted to the saw or cutter-spindle by a belt $c$.

A swinging frame D terminates at its upper end in a pair of branches $d$ $d'$, by means of which it is loosely mounted about the shaft B. The said frame is also bifurcated at its lower end, terminating in the branches $d^2$ $d^3$, in which a shaft E is secured and provided intermediate between the branches $d^2$ $d^3$ with a loose pulley $c'$, adapted to receive one part of the belt $c$, leading from the drive-wheel C, and serving as a guide for the said belt in its passage to the saw or cutter-spindle.

A pair of vibrating standards F F' are pivotally secured at their lower ends upon studs $f f'$, projecting inwardly from the sides A A' of the supporting-frame and carrying in their upper ends a shaft G. The standards F F' preferably slant gradually toward each other as they extend upwardly from their supports $f f'$, as clearly indicated in Fig. 1. A depending frame H terminates at its upper end in a pair of branches $h$ $h'$, mounted upon the shaft G between the standards F F', so as to swing freely relatively to said standards. At its lower end the said frame H terminates in a pair of branches $h^2$ $h^3$, in which the saw or cutter-spindle I is journaled and provided intermediate of the said branches with a pulley $i$ for the reception of the band $c$. The belt or band $c$, after passing around the under side of the guide-pulley $c'$, extends to and around the pulley $i$, and thence returns beneath the second guide-pulley $c^2$, journaled near the lower end of the swinging frame D, and thence to the drive-wheel C.

The spindle I is shown in the present instance as having a saw K fixed thereto, but it is obvious that any well-known and suitable cutter—such, for example, as a dado-cutter—might be substituted for the saw. A link L, loosely connecting the shaft E with the spindle I, serves to hold the spindle at all times at such a distance from the guide-pulleys $c'$ and $c^2$ as to keep the belt or band $c$ taut.

The upper end of the swinging standards F F' and the shaft G, carried by them, from which the frame H, depends is caused to move simultaneously with the swinging frame D by means of a link L', loosely connected with the frame D and with the shaft G, and corresponding in length with and parallel to the link L. The distance from the pivotal point of the standards F F' to the pivotal connection of the depending frame H, with the standards, is made equal to the distance of the saw or cutter-spindle from said pivotal connection of the frame H with the standards, so that as the standards F F' are caused to vibrate upon their fixed supports, tending to carry their upper ends through an arc, which would tend to advance the saw in a curve away from or above a right line, the depending frame H, swinging at the same time upon its pivotal connection with the standards, will tend to carry its lower end or the cutter-spindle through a similar arc, which would cause the saw to swing below a right line, the result of these two motions being a right line intermediate between the two arcs.

By the above construction I am enabled to do away with sliding friction and move the saw or cutter with great precision along the right line.

In order to do away with the necessity of providing a vertical adjustment for the saw or cutter to vary the depths of cut and the consequent complications in mounting the saw or cutter, I have provided simple and effective means for raising and lowering the table upon which the material to be cut rests.

M represents the table provided with the depending bracket $m$, fitted at its rear end to vertical ways $a^3$ upon the supporting-frame, so as to slide up and down thereon. The connection between the rear of the table and bracket $m$ with the ways $a^3$ may be of the well-known tongue-and-groove type. An adjusting-screw N is engaged at its upper end with the table and bracket M $m$, so as to rotate freely, and at its lower end is screw-threaded and registers with a threaded socket in a lug or arm $a^4$, projecting forwardly from the supporting-frame. The adjusting-screw N is provided with a bevel-faced pinion $n$, fixed thereon, which gears with a bevel-faced pinion $o$, fixed on a forwardly-extending shaft O, loosely mounted in hangers $m'$, depending from the under side of the table M. The shaft O is conveniently provided at its forward end with an operating-wheel $o'$. By turning the wheel $o'$ the adjusting-screw N may be turned in the direction to raise or lower the table M, as may be desired.

What I claim is—

1. The combination, with a suitable supporting-frame and a swinging frame mounted therein, of a vibrating standard, a depending frame pivotally secured to the free end of the vibrating standard and carrying a cutter-spindle in its lower end, links connecting the free end of the vibrating standard and the free end of the depending spindle-frame with the said swinging frame, and means for imparting motion to the spindle, substantially as set forth.

2. The combination, with a suitable supporting-frame and a swinging frame mounted therein, of a vibrating standard, a depending frame pivotally secured to the free end of the vibrating-standard and carrying a cutter-spindle in its lower end, links connecting the free end of the vibrating standard and the free end of the depending spindle-frame with the said swinging frame, a drive-belt engaged with a pulley on the spindle, guide-pulleys mounted in the lower end of the swinging frame for directing the driving-belt, and means for imparting motion to the belt, substantially as set forth.

ERNST F. AUTENRIETH.

Witnesses:
FREDK. HAYNES,
GEORGE BARRY.